July 10, 1956     A. SPORKET     2,753,649

ARTIFICIAL FISH LURE

Filed Aug. 3, 1953

INVENTOR.
Albert Sporket
BY Barthel & Bugbee
Attys

United States Patent Office 2,753,649
Patented July 10, 1956

2,753,649

ARTIFICIAL FISH LURE

Albert Sporket, Detroit, Mich.

Application August 3, 1953, Serial No. 371,955

1 Claim. (Cl. 43—42.5)

This invention relates to artificial fish lures.

One object of this invention is to provide an artificial fish lure having a trough-shaped or channel-shaped configuration with an arcuate longitudinal shape which not only gives a fish-like swimming motion when drawn through the water but also provides a strong and durable support for the attachment of the hooks.

Another object is to provide an artificial fish lure of the foregoing character which is easily and inexpensively made from bending sheet metal or from plastic molding operations and which, although simulating the appearance of a fish, has a very light weight in comparison with the apparent solid construction of the body of the fish lure when viewed from the top or sides thereof.

Another object is to provide an artificial fish lure of the foregoing character having an integral headpiece or vane, not only for simulating the appearance of the head of a fish but also for imparting a superior swimming and diving action to the fish lure while it is being drawn through the water.

Another object is to provide an artificial fish lure of the foregoing character having an improved and adjustable means for the attachment of the fish line to the lure.

Other objects and advantages of the invention will become apparent during the course of the following description of the accompanying drawings, wherein.

Figure 2:
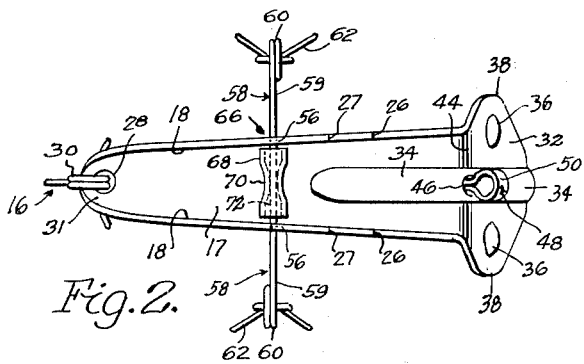
Figure 2 is a top plan view of the fish lure shown in Figure 1.
Figure 4:
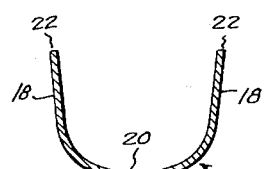
Figure 4 is a vertical cross-section taken at the line 4—4 in Figure 1, showing the channel cross-section thereof.
Figure 1:
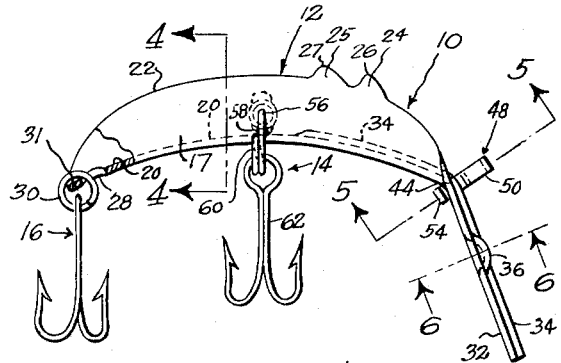
Figure 1 is a side elevation, partly in vertical section, of an artificial fish lure according to one form of the invention.
Figure 3:
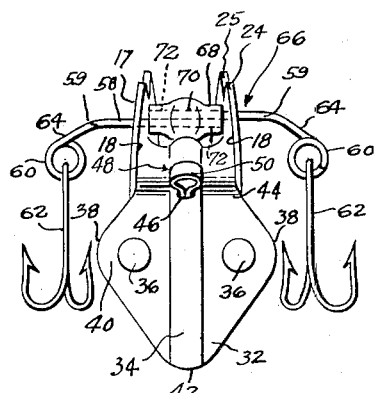
Figure 3 is a front end elevation of the fish lure shown in Figures 1 and 2.

Referring to the drawings in detail, Figures 1 to 3 inclusive show an artificial fish lure, generally designated 10, according to one form of the invention as consisting generally of a body 12 of bent sheet material, such as sheet metal or of molded material, such as synthetic plastic material, equipped with a side hook assembly, generally designated 14, and a rearward hook unit 16. The body 12 has a main portion 17 of channel-shaped cross-section (Figure 4) with slightly divergent side flanges 18 and a bottom portion or web portion 20 of arcuate cross-section both longitudinally and transversely (Figures 1 and 4). The upper edges 22 of the side flanges 18 are provided with one or more upwardly-projecting fins 24, 25 (two being shown) and taper downwardly substantially to points at their opposite ends 26, 27. The rearward end 31 of the bottom portion 20 is provided with an aperture 28 for receiving the attachment ring 30 by which the rearward hook unit 16 is secured thereto. The forward end of the main body portion 17 is provided with a widened head portion or vane 32 extending downwardly at an acute angle to the tangent drawn to the arc of the bottom portion 20 (Figure 1), and assisting in the swimming and diving action of the fish lure, as well as simulating the appearance of a fish head.

Figure 5:
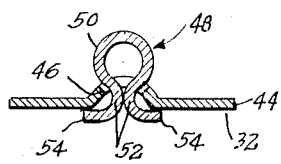
Figure 5 is a fragmentary inclined cross-section taken at the inclined line 5—5 in Figure 1, showing the line attachment means.
Figure 6:
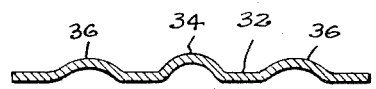
Figure 6 is an enlarged fragmentary cross-section taken through the headpiece or vane at the inclined line 6—6 in Figure 1, showing the configuration and reinforcing rib thereof.
Figure 7:
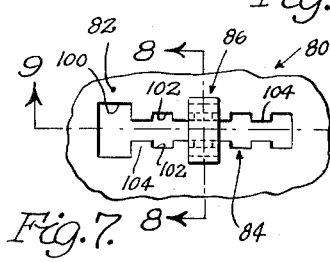
Figure 7 is an enlarged fragmentary approximately top plan view, in an inclined direction, of a portion of the headpiece showing a modification with an adjustable line attachment means.
Figure 8:
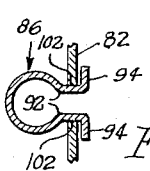
Figure 8 is a cross-section taken at the line 8—8 in Figure 7.

To strengthen the connection between the head portion 32 and the main body portion 17, there is provided a rib 34 extending along the bottom 20 of the body and downwardly along the head portion 32. The head portion 32 is also provided with struck-up knubs 36 simulating the eyes of a fish. The head portion 32 is shaped approximately like an arrow head, with the eyes 36 located at the rounded corners of the widest portion 40 and the rib 34 extending downwardly to the rounded point 42 thereof. The head portion 32 at its junction 44 with the main body portion 17 is provided with a hole 46 in the rib 34. Inserted in the hole 46 (Figure 5) is a line attachment eye 48 of approximately the shape of a Greek letter omega, in that it has a major annular portion 50 with portions 52 bent toward one another to form a neck portion, and with the end 54 bent outwardly therefrom on opposite sides of the edge of the hole 46 to secure the line attachment eye 48 in the hole 46. The fact that the hole 46 is formed in the rib 34 causes the ends 54 of the eye 48 to engage the head portion 32 at a location spaced apart from and below the point of engagement of the annular portion 50 with the edges of the hole 46, thereby giving a stronger leverage and purchase of the eye 48 upon the body 12 than it would otherwise have if the hole 46 were formed in a flat piece of material.

The opposite side flanges 18 of the main body portion 17 are provided with approximately aligned holes 56 for the passage of the halves 59 of a cross rod or outrigger 58, the outrigger halves 59 consisting of two oppositely-bent rods having their inner end portions inserted through the hole 56 and overlapped side by side in the space between the side flanges 18. The outrigger halves 59 have their outer ends bent into eyes as at 60 for receiving the side hook units 62. The rear and side hook units 16 and 62 are of conventional construction and may be either the treble hooks shown or single hooks, as desired. The halves 59 of the outrigger 58 have their end portions 64 bent downwardly toward the eyes 60 (Figure 3) in order to increase the stability of "hang" of the side hook assembly, generally designated 66, and consisting of the outrigger 58, the two hook units 62 on the opposite ends thereof, and a tubular coupling member 68 which is crimped as at 70 to clamp the opposite inner end portions 72 of the outrigger halves 59 against one another in their overlapping position (Figure 3). In order to facilitate parallelism of the overlapped end portions 72, their respective holes 56 are offset laterally relatively to one another by a distance equal to the thickness of one of the end portions 72 (Figure 3).

Figure 9:
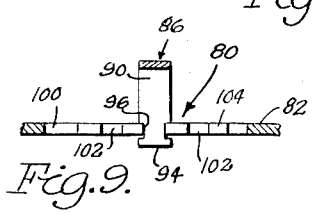
Figure 9 is a fragmentary longitudinal section taken at the line 9—9 in Figure 7.
Figure 10:
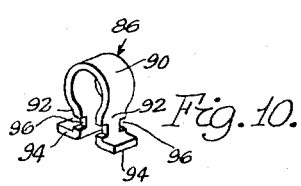
Figure 10 is a detail perspective view of the adjustable line attachment eye used in the modification of Figures 7, 8 and 9.

The modified line attachment construction, generally designated 80 (Figures 7 to 10 inclusive) consists generally of the modified head portion 82 corresponding generally to the head portion 32 but having an aperture 84 of slightly different construction, and a line attachment eye 86 corresponding generally to the line attachment eye 48 but likewise differing somewhat in detail. The line attachment eye 86 is also of approximately the shape of a Green letter omega consisting of an interrupted approximately annular portion 90, inwardly-bent portions 92 forming a narrow neck, and arms 94 bent outwardly in opposite directions from the inwardly-bent portions 92. Notches 96 are formed in opposite edges of the inwardly-bent or neck portions (Figure 10). The aperture 84, instead of being approximately circular as is the aperture 46, is elongated, with an end portion 100 of maximum width sufficient for receiving the entire width of the ends 94 of the eye 86, and a plurality of narrow width portions 102 separated from one another by still narrower connecting portions 104. The portions 102 of intermediate width serve to receive the sides of the neck portion 92 of the eye 86 with the notches 96 engaging the edges of the aperture portions 102 (Figure 9).

In the operation of the invention, the fisherman attaches a fishing line to the line attachment eye 48 or 86, as the case may be, preferably with the use of a conventional swivel therebetween. The fisherman uses the fish lure 10 by casting or trolling in the manner customarily used with other fish lures, the fish lure 10 moving along in a manner closely simulating a swimming fish. If the fisherman wishes to change the diving or darting characteristics of the fish lure 10, he holds the main body portion 17 in one hand and bends the head portion 32 relatively to it by the use of the fingers of the other hand, until by trial and error he obtains the effect he desires. The channel-shaped construction of the main body portion 17 gives it great strength and rigidity, yet has the appearance of a solid fish when viewed from above, below or from either side. When a fish strikes at the rear hook unit or either of the side hook units 62, it is firmly held because of the strong construction of the fish lure. At the same time, however, the outrigger 58 suspends the side hooks 62 at locations where they cannot interfere with each other, with the rear hook unit 16 or with any portion of the body 12.

In the operation of the modified construction 80 (shown in Figures 7 to 10 inclusive), to adjust the position of the line attachment eye 86 lengthwise along the notched elongated aperture 84, the operator squeezes the neck portions 92 or the end portions 94 together, narrowing the combined width thereof so that they can be slipped through the narrow slot 104 between the notches or widened portions 102. The line attachment eye 86 may therefore be moved from one notch to another of the notches 102, and, when released, its neck portions 92 spring outward, due to the resilience of the material of the eye 86 and engage the sides of the notch 102, with the notches 96 in the eye 86 engaging the ends of the notches 102. If, however, the operator wishes to remove the eye 86 entirely, he moves it to the end of the elongated stepped aperture 84 into the space 100 of maximum width, which is sufficiently wide to permit removal of the eye 86 by withdrawing its end portions 94 through the aperture portion 100. In this manner, the point of attachment of the line can be varied, and the action of the fish lure in moving through the water accordingly varied.

What I claim is:

An artificial fish lure comprising an elongated lure body of sheet material and of channel cross-section with laterally-spaced upstanding side flanges extending therealong, said side flanges having transversely-directed holes therethrough disposed in approximate alignment but offset slightly relatively to one another, an outrigger including two wire outrigger halves mounted in said holes with their inner end portions disposed side-by-side in the space between said flanges in substantially parallel overlapping relationship, and clamping means securing the overlapping inner end portions of said outrigger halves tightly to one another, said holes being offset a distance equal approximately to the thickness of one of said outrigger halves; said outrigger halves having their outer end portions extending outwardly beyond said flanges; fish hooks connected to the outer ends of said outrigger halves, and line attachment means secured to said body remote from said outrigger.

References Cited in the file of this patent
UNITED STATES PATENTS

| | | |
|---|---|---|
| 1,407,877 | Mott | Feb. 28, 1922 |
| 1,495,927 | Roland | May 27, 1924 |
| 1,585,943 | Streich | May 25, 1926 |
| 1,598,239 | Bruckner | Aug. 31, 1926 |
| 1,742,786 | Roberts | Jan. 7, 1930 |
| 1,963,380 | Peters et al. | June 19, 1934 |
| 2,152,275 | Parkins | Mar. 28, 1939 |
| 2,159,230 | Sage | May 23, 1939 |
| 2,342,832 | Borchers | Feb. 29, 1944 |
| 2,484,747 | Russell | Oct. 11, 1949 |
| 2,538,703 | Perry | Jan. 16, 1951 |
| 2,696,694 | Conder et al. | Dec. 14, 1954 |